United States Patent [19]

Binderbauer et al.

[11] Patent Number: 4,921,131
[45] Date of Patent: May 1, 1990

[54] LIQUID DISPENSER

[76] Inventors: Horst Binderbauer; Michl Binderbauer, both of 7431 Baxtershire, Dallas, Tex. 75230

[21] Appl. No.: 224,666

[22] Filed: Jul. 27, 1988

[51] Int. Cl.⁵ .......................... B67D 5/08; B67D 3/00; G04C 5/08

[52] U.S. Cl. ...................... 222/52; 222/644; 222/105; 222/107; 222/181; 222/504; 222/547; 220/403

[58] Field of Search .................. 222/52, 92, 105, 107, 222/156, 180, 181, 504, 547, 564, 644; 239/104; 220/5 A, 5 R, 403; 383/904, 906, 907

[56] References Cited

U.S. PATENT DOCUMENTS

| | | |
|---|---|---|
| 2,387,359 | 10/1945 | Scarry . |
| 3,033,248 | 5/1962 | Ritchie . |
| 3,100,588 | 8/1963 | Pearson, Jr. .......................... 222/156 |
| 3,151,340 | 10/1964 | Teshima . |
| 3,273,752 | 9/1966 | Horeczky . |
| 3,333,160 | 7/1967 | Gorski . |
| 3,415,278 | 12/1968 | Yamamoto et al. . |
| 3,434,628 | 3/1969 | Ceraldi . |
| 3,487,477 | 1/1970 | Classen . |
| 3,556,146 | 1/1971 | Groen . |
| 3,588,038 | 6/1971 | Tanaka . |
| 3,639,920 | 2/1972 | Griffin et al. . |
| 4,257,535 | 3/1981 | Mellett ................................ 222/92 |
| 4,270,673 | 6/1981 | Rodth ............................... 222/129.1 |
| 4,450,987 | 5/1984 | Boettcher et al. .................. 222/504 |
| 4,576,612 | 3/1986 | Maddison et al. .................. 222/181 |
| 4,607,766 | 8/1986 | Jones .................................. 222/504 |
| 4,624,395 | 11/1986 | Baron et al. ....................... 222/641 |
| 4,640,328 | 2/1987 | Arney ................................ 220/5 A |
| 4,722,372 | 2/1988 | Hoffman et al. . |
| 4,804,118 | 2/1989 | Mullen et al. ...................... 222/504 |

Primary Examiner—F. J. Bartuska
Assistant Examiner—Steven Reiss
Attorney, Agent, or Firm—Sigalos, Levine & Montgomery

[57] ABSTRACT

A sanitary liquid dispenser having an essentially spherical housing with a downwardly extending portion surrounding a recessed discharge port, the dispenser further including a proximity detector for activating a discharge mechanism when detecting the proximity of an object therebeneath, the dispenser further including therewithin a fluid reservoir having a disposable deformable bag with an essentially vertically disposed and integrally formed extension projecting downwardly therefrom and wherein there is included a valve disposed within such downwardly projecting extension or within a contiguous supporting member.

31 Claims, 3 Drawing Sheets

LIQUID DISPENSER

BACKGROUND OF THE INVENTION

This invention relates to liquid dispensers, and more particularly to such dispensers which are specially adapted for dispensing soaps and sterile cleansing fluids such as antiseptic soaps and sterilizing solutions.

Fluid dispensers have heretofore been known, illustrative of which are those disclosed in U.S. Pats. 2,387,359 granted to E. J. Scarry on Oct. 23, 1945; and 3,273,752 granted to G. E. Horeczky on Sept. 20, 1966. The proposals of these and other patents have covered a wide range of features attempting to contribute to the more effective distribution of ordinary cleansing fluids such as soap and to the sterile dispensation of cleansing fluids for use in various environments such as hospitals, food processing establishments, and the like where use of sterile fluids is required. In such environments there is often contamination of the hands with infection materials, and use of a contaminated hand to actuate a dispenser can result in placing such infectious material on the dispenser and even result in the infectious organisms in such materials contaminating the cleansing fluid in the dispenser.

Also, in such environments the flow of air can carry infectious organisms and trap them in nooks and crannies of the dispensers where they can again present contamination problems.

Further, while many soaps and solutions are initially sterile when placed in a dispenser, there are no sure means provided to ensure their sterility during use. Proposals in the noted patents and in other devices to overcome contamination problems have included features such as proximity actuation (i.e., actuation without actually touching a control or actuating member), and efforts to seal the cleaning fluids from the ambient contaminating environment. However, there has not been embodied in any single dispenser all of a number of features which are deemed necessary and/or desirable to ensure continued dispensing of sterile cleaning fluids over an extended period of time. Accordingly, there has continued to be a need for further improvement in apparatus especially adapted for the dispensation of sterile fluids which are subject to a minimum risk of contamination.

OBJECTS AND FEATURES

Accordingly, it is one object of this invention to improve sterile fluid dispensers.

It is another object of the invention to reduce contamination hazards for sterile cleansing fluids.

It is still another object of the invention to provide a readily observable visual indication of the amount of fluid remaining in the dispenser.

It is yet a further object of the invention to provide an improved disposable container for sterile fluids.

Accordingly, in accordance with one feature of the invention, the fluid dispenser housing is generally rounded (e.g., spherical or eliptical), thereby minimizing the adherence of contaminates thereto and inhibiting their proliferation.

In accordance with another feature of the invention, there is provided a disposable fluid container having adjacent the exit port thereof a slidably removable valve seat and gate which, when inserted within the solenoid actuating mechanism that is permanently affixed to the housing, provide for controlled fluid flow.

In accordance with yet another feature, the aforementioned valve seat and gate are an integral part of an extension of the disposable fluid container, thereby reducing vulnerability of the fluid to leakage or contamination.

In accordance with another feature of the invention, the surfaces of the disposable fluid container are rounded and not planar, thereby additionally minimizing adherence of contaminates thereto and inhibiting their proliferation.

In accordance with still another feature of the invention, the upper portion of the fluid container is progressively deformable so as to permit its progressive collapse as the fluid exits the container, thereby preventing the entry of air and avoiding contamination.

In accordance with still another feature of the invention, the upper portion of the fluid dispenser housing is transparent, and the upper portion of the fluid container is at least translucent (i.e., translucent or transparent) thereby providing for ready visual observation of the quantity of remaining fluid.

In accordance with another feature of the invention, provision is made for adjustability of the time of actuation and, correspondingly, the quantity of fluid dispensed.

In accordance with still another feature of the invention, the dispenser is conditioned to prevent excessive or duplicative dispensation of fluid, thereby contributing to its utility and effectiveness.

In accordance with yet another feature of the invention, the proximity sensing element is configured so that its exterior housing acts as a shield to prevent detection of objects other than those directly therebeneath.

These and other objects and features of the invention will be apparent from the following detailed description, by way of example of a preferred embodiment, as illustrated in the drawing.

BRIEF DESCRIPTION OF THE DRAWINGS

FIG. 4 is an enlarged cross section of the solenoid and valve actuating mechanism according to the preferred embodiment of invention;

FIG. 8 is a cross-section, similar to FIG. 4, showing a second embodiment of the fluid dispenser.

DETAILED DESCRIPTION

Figure 1:
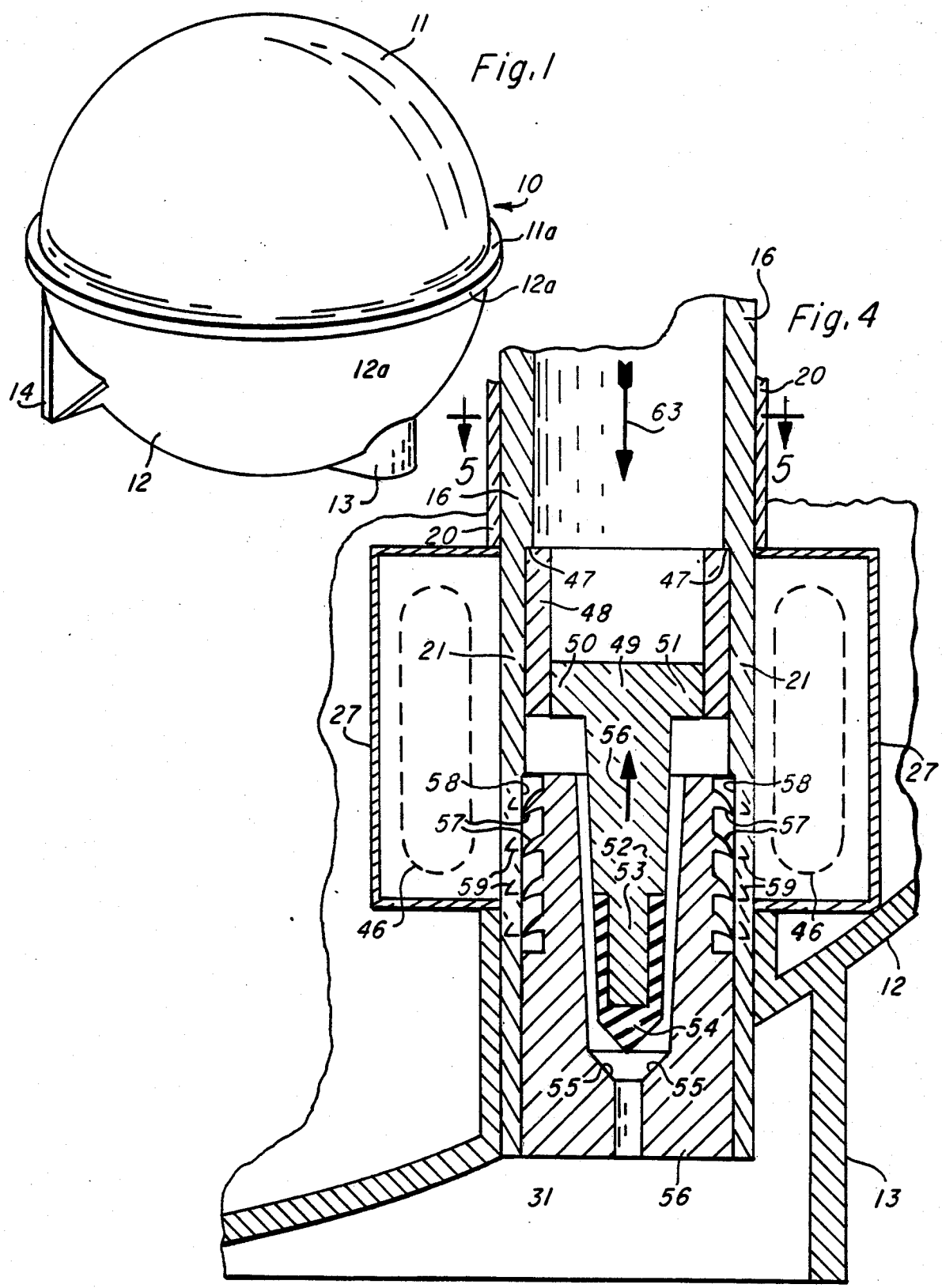
FIG. 1 is a perspective view depicting the exterior of the fluid dispenser housing.

Now turning to the drawings, and more particularly FIG. 1 thereof, it will be observed that there is depicted a generally spherical housing comprised of an upper hemispherical section 11 and a lower generally hemispherical section 12. Projecting from the lower hemispherical section 12 is optional exit port guard 13 which guards the lower end of a liquid dispensing tube (as hereinafter described) from contact with hands of the user or other external objects. Also projecting from the lower hemispherical section 12 is rear bracket mounting assembly 14, which is provided for mating engagement with a conventional wall bracket for support of the housing assembly.

Both hemispheres 11 and 12, are made of impact resistant smooth composition material such as polystyrol-abs. Upper hemisphere 11 is transparent so as to provide for visual observation of the upper interior contents of the sphere in order that level of fluid within the inner dispensing container can readily be seen. The spherical shape further contributes to the attractiveness of the assembly by minimizing surfaces that collect dust or contaminates, it having been found that spherical surfaces are less susceptable to the accumulation of such undesired products than are geometrical configurations having one or more planar surfaces. In this connection, it should be understood that although the upper and lower hemispheres are shown as being joined by flanges 11a and 12a, such flanges are exaggerated in size in order to add clarity to the drawing, it being contemplated that such flanges, if at all, are but minute enlargements of the thickness of the materials comprising the principal portions of hemispheres 11 and 12 so as to present a minimum of dust and contaminate collecting surfaces. Moreover, it is contemplated that any flanges will be curved (as shown in FIG. 2) so as to provide a smooth continuum of surface between themselves and the adjacent hemispherical shapes, thereby avoiding abrupt changes in surfaces that might provide host areas attractive to contaminates.

Figure 7:
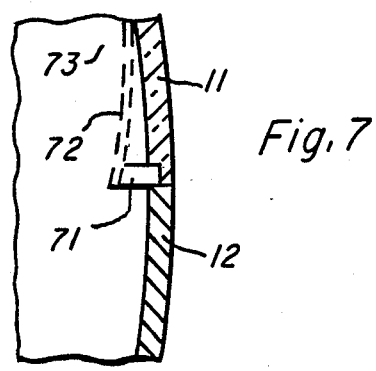
FIG. 7 is a vertical view of the notch lock of FIG. 6.
Figure 6:
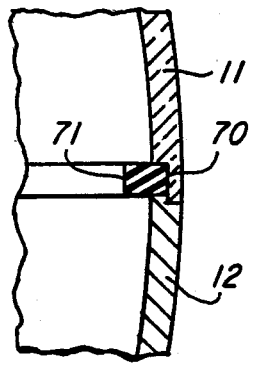
FIG. 6 is a vertical fragmentary view of the notching lock which prevents turning movement of the upper housing hemisphere which would result in disengagement.

Hemisphere 11 is retained in mating association with lower hemisphere 12, both by bayonet type form-fit of mating parts that are engaged by positioning the upper hemisphere onto the lower hemisphere and then twisting the upper hemisphere to fully engage the mating bayonet parts. When fully engaged, the mating loaded detent moves into a mating notch, thereby preventing reverse twisting unless and until the detent is released. This is accomplished by inserting one's finger into an aperture in the rear lower part of lower hemisphere 12 and exerting sufficient pressure on the detent to spring it out of its locking notch while turning the upper hemisphere to the disengaged position. Details of the detent and notch are illustrated in FIGS. 6 and 7 and are described below. When the hemispheres are disengaged, the interior of the assembly is exposed for the insertion and removal of batteries, a fluid reservoir support and the reservoir, (i.e., the interior bag hereinafter described) which contains the fluid to be dispensed.

Figure 2:
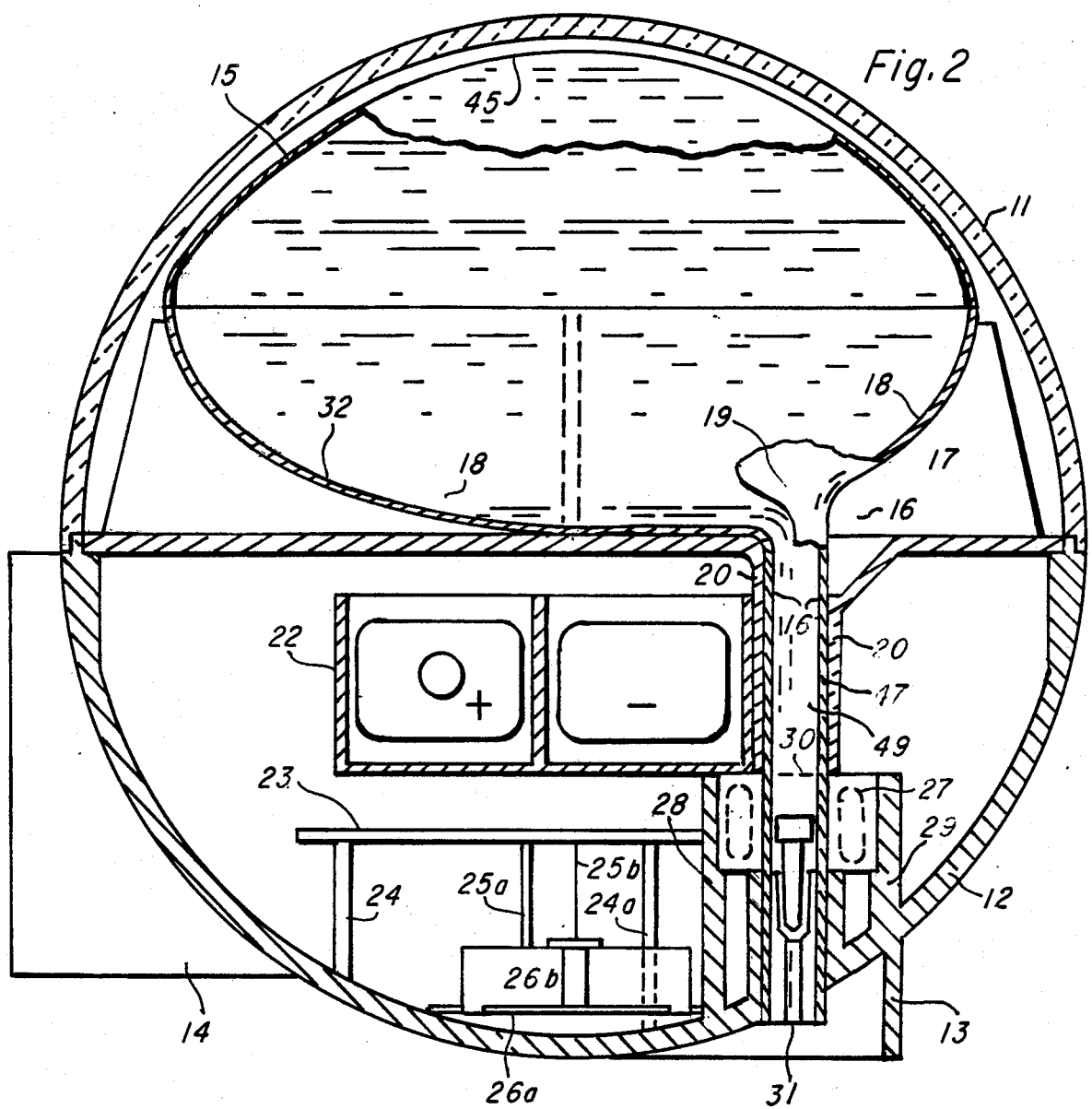
FIG. 2 is a vertical side cross section of the fluid dispenser.

Now turning to FIG. 2, the fluid dispensing assembly is seen in vertical partial side section. Within the upper hemisphere 11 there is positioned an oval bag 15, which preferably is constructed of translucent or transparent flexible materials such as thin polyethylene sheet. This bag 15 is shown in FIG. 2 as being essentially full of fluid and as such has its upper surface in a convex curve as shown. As fluid is drained from its interior, its upper surface deforms downwardly so as to maintain contact with the fluid within, thus preventing the entry of air or any other undesired substance such as contaminates.

At the lower right portion of bag 15 there is joined to the bag and sealed thereto a downwardly extending tubular extension 16, which is comprised of any suitable plastic-like material well-known in the art. This tubular extension 16 may extend as shown, be shorter, or optionally be longer and preferably includes a valve assembly similar to that of FIG. 4 which is described hereinafter.

As shown in FIG. 2, there is further included a curved conforming support piece 17, which is bowl-like in shape, so as to provide a conforming surface within which to contain and support the lower portion 18 of bag 15. Curved support piece 17 includes an aperture 19 and a downwardly extending rigid tube 20 which acts as a sleeve to guide and support tubular extension 16.

Included within the lower hemisphere 12 of assembly 10 is battery compartment 22 which is adapted for receiving and supporting two pairs of conventional dry-cell batteries shown and described in connection with FIG. 3. Immediately below battery compartment 22 is printed circuit board 23 which is supported by a pair of conventional upwardly projecting extensions 24 and 24a extending upwardly from the lower interior surface of lower hemisphere 12. Also, in the lower hemisphere 12 is proximity sensor element 25 which is supported within the lower extremity of hemisphere 12 by cross member 26.

The sensor is positioned from the exit port approximately the average of the center of an adult person's palm from the center of the fingers, thus resulting in dispensation of liquid into the palm. Moreover electrode 26 of sensor-detector 25 acts as a shield so as to impart a characteristic of directionality to the sensor-detector, thereby preventing detection and unwanted activation by objects other than those positioned immediately therebelow.

Further reference to sensor-detector 25 reveals that it includes outer electrode-shield 26 and inner electrode 26a. Electrical connections and physical support are provided by a pair of conductors 25a and 26b that extend respectively from electrode-shield 26 and inner electrode 26a to connections on circuit board 23. Shielding conductor 25b from unwanted contact with electrode-shield 26 is insulating grommet 26b.

Also within the lower hemisphere 12 is mounted a conventional donut-shaped solenoid coil 27 which is supported by two pairs of notched support members 28 and 29. As will be observed from the figure (and FIG. 4), an enlarged diameter section of extension 16 from bag 15 extends through the hollow central portion 30 of solenoid coil 27. However, in the alternative embodiment mentioned above, support tube 20 may be further extended and may contain the valve assembly. In such event, extension 20 and its included valve asssembly would extend through solenoid coil 27. Solenoid coil 30 is actuated by conventional circuits of printed circuit board 23 in response to the detection by proximity sensor element 25 of a near by activating element such as a hand.

The circuits of the printed circuit board 23 may be generally similar to those of Horeczky Pat. 3,273,752 and additionally include an R-C timing circuit that is adjustable to provide a correspondingly timed actuation of solenoid coil 27 which in turn results in a correspondingly adjustable time of liquid dispensing. Moreover, the circuits include a combination low battery and "dispenser activated" visual indicator 12a and a conventional adjustable delay reset that prevents undesired multiple dispensations that might otherwise occur if hands are retained in proximity to sensor 25 after a first measure of fluid is dispensed.

It should also be understood that the dispenser may be energized by conventional circuits operable from sources other than batteries, sources such as ordinary A-C power.

When solenoid coil 27 is activated, a valve assembly contained within extension 16 (as hereinafter more particularly described in connection with FIG. 4) is actuated, thereby permitting fluid within bag 15 to exit through tube extension 16 under the force of gravity. Such fluid descends through tube 16 and the valve and exists at the lower end 31.

Further reference to FIGS. 2 and 4 reveals that the discharge of fluid occurs at 31 so that the discharge location is recessed upwardly within exit port guard 13. Accordingly, the end 31 of the discharge port is protected from contact with adjacent external objects such as one's hand and additionally tends to be protected from contaminates which may be present in the air.

As heretofore mentioned, the upper inner surface 45 of oval bag 15 is made of readily deformable plastic-like material which not only is translucent or transparent to permit visual observation of its contents, but additionally, is sized so that when bag 15 is completely empty upper inner surface 45 is lowered to be in contact with the lower inner surface 32, thereby permitting bag 15 to be completely emptied without the entry of air thereinto.

Figure 3:
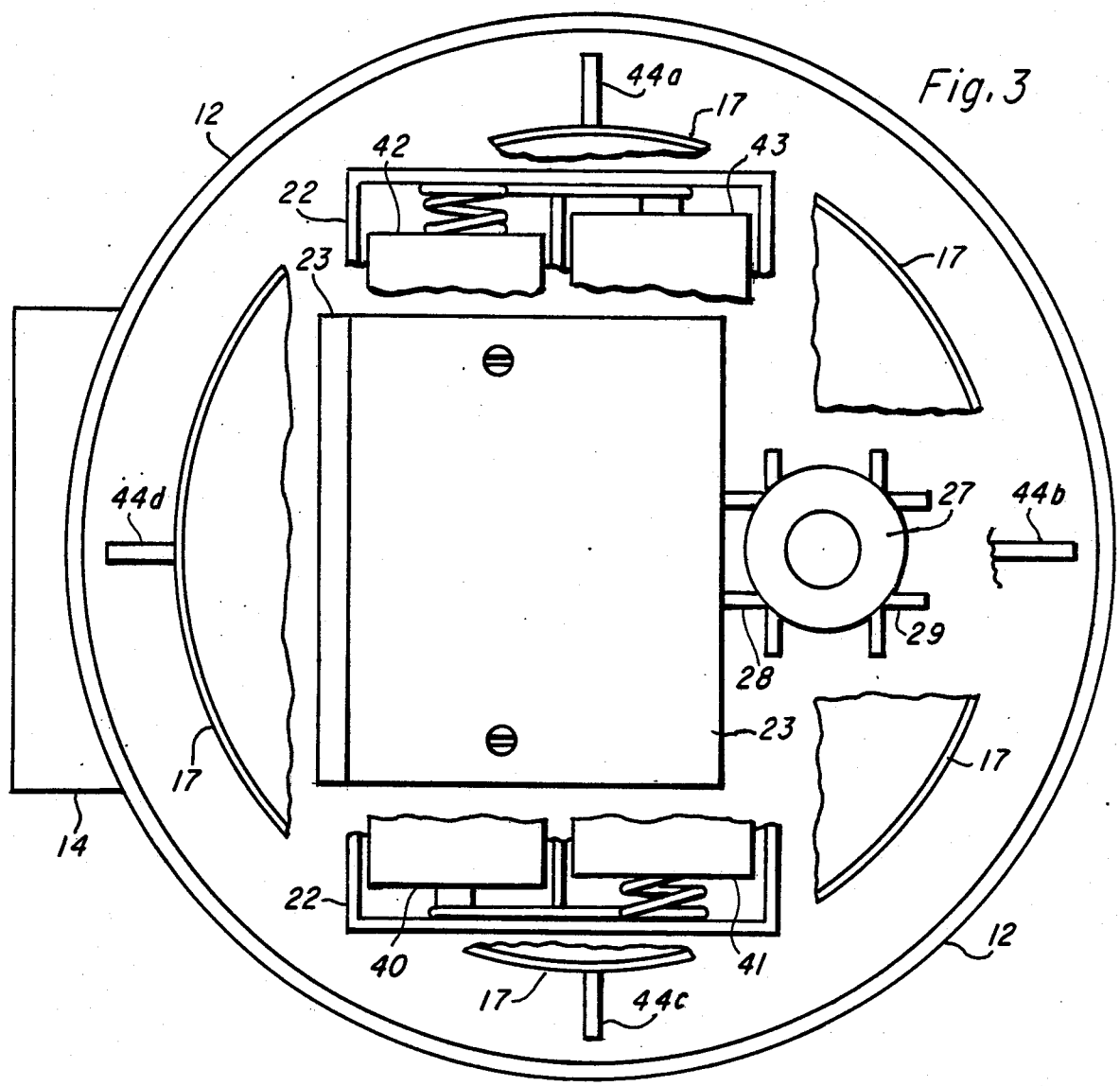
FIG. 3 is a partially cutaway horizontal sectional view depicting the lower hemisphere of the dispenser.

Now turning to FIG. 3, it will be observed that it is a horizontal section through the assembled unit. In addition to the parts hereinabove described with respect to FIGS. 1 and 2, there are disclosed conventional batteries 40, 41, 42 and 43 which are connected to provide energization for the printed circuit board 23 and solenoid coil 27. These batteries may be connected in series or in series parallel as requirements of specific components designated for the printed circuit board 23 may require.

As will be observed from inspection of FIG. 3, it is a double cut-away view to disclose three levels: first, the level at which curved conforming support piece 17 is positioned. Secondly, there is an intermediate lower level where battery compartment 22 is located; and further below the intermediate level is the level at which printed circuit board 23 is positioned.

Also shown in FIG. 4 are three conventional molded supports 44a-44d which are placed peripherally about the interior of the lower hemisphere shell 12 and are located at 90° displacements from each other in order to provide support for curved conforming support piece 17.

Now turning to FIG. 4, the aforementioned valve structure is shown in detail. Here solenoid winding 46 is shown within solenoid coil enclosure 27.

Within an enlarged diameter section 21 of extending rigid tube 16, there is seen to be a valve insert which is comprised of thin cylindrical iron sleeve 48 which is press fit onto plastic valve gate support plunger 49. Inset surfaces 47 are provided to act as a limit to the upper movement of vertically movable plunger 49, which is seen to be in its upward (valve open) position. Plunger 49 includes laterally extending portions 50 and 51 together with a vertically downward extending valve gate portion 52. At the lower extremity of valve gate portion 52 is a reduced dimension extension 53, onto which there is friction-fit a mating resilient valve gate member 54 which is adapted for engagement with valve seat surfaces 55. Arrow 55a is included to illustrate the vertical movement of the plunger 49 to open or close the valve which comprises valve gate member 54 and conical valve seat surface 55. As will be observed from an inspection of the drawing, the valve is shown in an open position which occurs when the solenoid 27 is energized. As will be evident to those skilled in the art, when solenoid 27 is de-energized, vertically movable plunger 49 moves downwardly under the influence of gravity until the mating surfaces of valve gate member 54 contact valve seat surfaces 55, thereby closing the valve. Further reference to FIG. 4 reveals the presence of valve seat block 56, which is press-fit into extending tube 16. The valve seat block 56 may be made of any suitable conventional resilient material (e.g., polyethelyne) so long as it does not interact unfavorably with the type of fluid to be dispensed.

Further reference to FIG. 4 reveals the extension of flutes 57 which project outwardly as shown from the main body of valve seat block 56. These flutes are sized to fit within portion 58 of extending tube 16. As will be observed from an inspection of FIG. 4, portion 58 has been intentionally made of slightly larger diameter so as to provide a region specially adapted for engagement with flutes 57.

To further illustrate the fact that the resilient flutes 57 within mating region 58 are slightly larger in diameter than region 58, dotted lines 59 show the shape of the flutes prior to insertion within tube 16.

To further assist in providing a tight sanitary seal, the lower portion of valve seat block 56 is fit snugly. When squeezed within the extending rigid tube 16 flutes 57 compress to a diameter as shown in FIG. 4, thus ensuring a tight and reliable seal.

Figure 5:
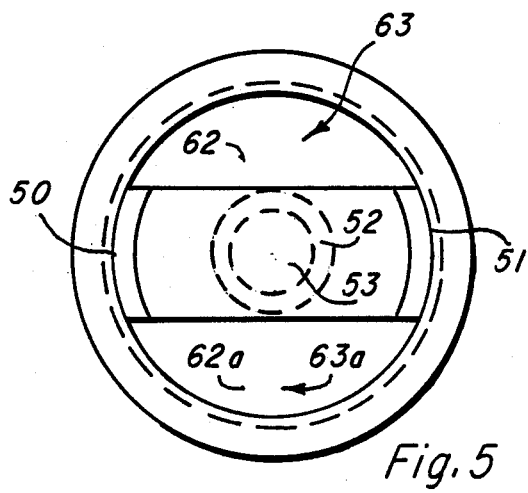
FIG. 5 is a partial sectional view illustrating the geometries of the fluid flow passage adjacent the movable element of the valve mechanism.

As mentioned above, FIG. 5 is a partial sectional view to show the fluid flow passages that extend past vertically movable plunger 49. As observed from reference to FIG. 5, laterally extending portions 50 and 51 of plunger 49 are in slidable engagement with the inner walls of extending tube 16. (Or if the aforementioned alternate embodiment is employed, engagement with the inner wall of tubular extension 20). However, laterally extending portions 50 and 51 describe only arcs of circles and do not close off the passageway within tube 16. Thus, it will be observed that on either side of plunger 49 there are spaces 62 and 62a which permit vertical travel of fluid as illustrated by the end view of arrows 63 and 63a. Accordingly, there is ample passageway for the vertical movement of fluid from bag 15 downwardly and through the valve to the export port.

Now turning to FIG. 6, the locking mechanism that locks the upper hemisphere 11 to lower hemisphere 12 is shown in partial section. In FIG. 6, the locking mechanism is viewed from the top and is seen to comprise notch 70 which exists in both hemisphere 11 and hemisphere 12 at a point of junction therebetween. Also shown is detent 71, which is shown residing within the notch 70 and in a position to lock the two hemispheres together to prevent rotational movement therebetween.

The hemispheres are joined together by conventional mating bayonet type sleeve engagements which are segmented peripherally about the adjoining surfaces and which are engaged by positioning hemisphere 11 atop hemisphere 12 with the engaging surfaces in mating contact. Upper hemisphere 11 is then turned or partially rotated so that the bayonet surfaces lock the two members together. Detent 71 then moves into locking engagement within recess 70 to prevent upper hemisphere 11 from being turned in reverse to the disengaging position unless and until the detent 71 is temporarily moved out of locking position by an operator.

FIG. 7 illustrates a partial side-sectional view of the detent mechanism which is shown in dotted form and comprises detent projection 71 and flexible spring extending mounting arm 72. Spring arm 72 is connected to the interior of hemisphere 11 at 73 and is flexed so as to normally urge detent 71 into a position which would cause it to snap into recess 70 and to remain there unless manually forced out of position by an operator. An aperture (not shown) is suitably provided in the rear lower part of hemisphere 12 immediately in front of mounting member 14 and is thus obscured from normal view. When it is desired to disengage the upper hemisphere 11, an operator reaches underneath and to the rear portion of lower hemisphere 12 placing his finger up within the recess and feeling for portion 72 of the detent member. He then urges it forward out of locking engagement position while with the remaining hand twisting the upper hemisphere 11 so as to achieve the releasing position.

It should be understood that, although the locking mechanism is shown with the detent connected into the upper hemisphere 11, it could be joined to lower hemisphere 12 without departing from the principles herein described.

To prepare for the assembly and load it for liquid dispensing, upper hemisphere 11 is removed by first disengaging the locking mechanism illustrated in FIGS. 6 and 7. It is then twisted to disengage the mating bayonet surfaces and pulled up vertically, thus exposing the interior of the unit. The curved conforming support piece 17 is lifted upwardly to expose conventional battery compartment 22, and four "D" size dry-cell batteries or the equivalent are then inserted in the compartment. The curved conforming support piece 17 is then returned to its normal position and a fluid containing bag 15 is installed by placing it within support 17 with the downwardly extending extension 16 of bag 15 being inserted within the mating aperture and rigid support tube 20 as shown in FIG. 2. When extension 16 is firmly seated within tube 20, the upper hemisphere 11 may then be re-engaged and locked in place, thus securing the unit from dust or atmospheric contaminates.

To operate the unit, one or both hands are positioned beneath exit port guard 13, with the fingers extending toward the center of lower hemisphere 12 such that they are in proximity to proximity sensor element 25. Proximity sensor element 25 recognizes the presence of the hand or hands and energizes solenoid coil 27 so as to cause the above described valve to open, thereby initiating dispensation of fluid. After a predetermined and adjustable period of time, the valve closes and will not again open until proximity detector 25 senses the complete removal of the hands from the vicinity of the unit followed by a predetermined and adjustable period of time.

The adjustability in times maybe accomplished by conventional resistance-capacitance timing circuits that are well known in the art and form a part of the circuitry on printed circuit board 23. Adjustment of the discharge interval and the reset interval may be made by conventional variable resistor controls positioned within the enclosure on or adjacent to circuit board 23, or they may be located within lower hemisphere 12 with an extension through the case of hemisphere 12 to the exterior to provide for exterior adjustment.

As mentioned above, in certain applications, extension 20 from support 17 may be further elongated and the above described valve may be included therein rather than fit within tube 16.

It will now be evident that there has been described an improved liquid dispenser having the aforementioned features which render the dispenser attractive and effective in preventing liquid contamination.

While the invention has been described in connection with preferred embodiments, it is not intended to limit the scope of the invention to the precise forms set forth; but on the contrary, it is intended to cover all adaptations and modifications that may be included within the spirit and scope of the invention as defined by the appended claims. Thus, for example, prevention of contact with hands may be accomplished without a projection such as guard 13 if a recess is provided within the lower hemispherical section 12.

The terms and expressions used herein are employed as terms of description and not of limitation, and thus there is no intent in the use thereof to exclude any and all equivalents but on the contrary it is intended to include all such that fall within the inventive scope of the subject matter hereof.

We claim:

1. A sanitary liquid dispenser comprising:
   a. an essentially spherical housing having a lower hemisphere and a detachable upper hemisphere; said lower hemisphere including at a lower surface thereof, a downwardly extending portion surrounding a vertically disposed aperture leading into the interior of said housing;
   b. mounting means connected to the exterior of said housing for mounting said dispenser on a support;
   c. proximity detection means including a proximity detector mounted in the lower part of said lower hemisphere for detecting the proximity of an object therebeneath when near said proximity detector and for producing an electrical signal indicative of the detection of said object;
   d. electrical valve-actuating means connected to said proximity detection means and responsive to said electrical signal for assuming a valve actuating condition;
   e. fluid reservoir means including a disposable deformable bag, said bag having an essentially vertically-disposed and non-deformable, integrally formed extension projecting downwardly from said bag and including a valve seat and a valve gate within said extension; and
   f. means including said valve-actuating means when in said valve actuating condition for opening said valve for a predetermined time interval thereby to permit a predetermined quantity of fluid to flow from said bag.

2. A sanitary liquid dispenser according to claim 1 in which said disposable deformable bag includes an upper section adapted to be light transmissive.

3. A sanitary liquid dispenser according to claim 2 in which said light transmissive section is transparent.

4. A sanitary liquid dispenser according to claim 1 in which said upper hemisphere is transparent.

5. A sanitary liquid dispenser according to claim 1 in which said disposable deformable bag is oval shaped.

6. A sanitary liquid dispenser according to claim 1 in which said valve seat and valve gate are disposed in vertical configuration whereby when said valve moves between open and closed positions, said valve gate moves in a vertical direction.

7. A sanitary liquid dispenser according to claim 1 wherein said vertically disposed aperture includes a position recessed within said aperture where said fluid is discharged, thereby protecting the location at which such discharge occurs from accidental external contact.

8. A sanitary liquid dispenser according to claim 1 further including adjusting means for adjusting said time interval.

9. A sanitary liquid dispenser according to claim 1 further including reset means responsive to the closing of said valve for preventing said valve from reopening until a predetermined time interval has transpired.

10. A sanitary liquid dispenser according to claim 1 in which said object is a hand.

11. A sanitary liquid dispenser according to claim 1 in which said object is a head.

12. A sanitary liquid dispenser according to claim 1 in which a major part of said deformable bag is comprised of reversibly deformable material adapted to deform inwardly as fluid is drained from said bag thereby preventing entry of air thereinto to replace drained fluid and wherein said valve seat and valve gate within said extension are selectively conditionable between open and closed positions, thereby to permit or prevent flow of fluid from said bag.

13. A sanitary liquid dispenser according to claim 1 in which said vertically-disposed extension projecting downwardly from said bag includes only one valve seat and one valve gate within said extension 14. A sanitary liquid dispenser comprising:
  a. an essentially spherical housing having an lower hemisphere and a detachable upper hemisphere; said lower hemisphere including at a lower surface thereof, a downwardly extending portion surrounding a vertically disposed aperture leading into the interior of said housing;
  b. mounting means connected to the interior of said housing for mounting said dispenser on a support;
  c. proximity detection means including a proximity detector mounted in the lower part of said lower hemisphere for detecting the proximity of an object therebeneath when near said proximity detector and for producing an electrical signal indicative of the detection of said object;
  d. electrical valve-actuating means connected to said proximity detection means and responsive to said electrical signal for assuming a valve-actuating condition;
  e. fluid reservoir means including a disposable deformable bag, said bag having an essentially non-deformable vertically disposed, and integrally formed extension projecting downwardly from said bag;
  f. curved rigid support means within said housing, said support means being shaped for conforming contiguous fit to the exterior curvature of the lower exterior surface of said deformable bag;
  g. downwardly extending rigid tubular guide means integral with said support means, said guide means receiving and enclosing said vertically disposed extension, said guide means further having an electrically actuable valve mounted therein; and
  h. means including said valve-actuating means when in said valve-actuating condition for opening said valve for a predetermined time interval thereby to permit a predetermined quantity of fluid to flow from said bag.

15. A sanitary liquid dispenser according to claim 14 in which said disposable deformable bag includes an upper section adapted to be light transmissive.

16. A sanitary liquid dispenser according to claim 15 in which said light transmissive section is transparent.

17. A sanitary liquid dispenser according to claim 14 in which said valve seat and valve gate are disposed in vertical configuration whereby when said valve moves between open and closed positions, said valve gate moves in a vertical direction.

18. A sanitary liquid dispenser according to claim 14 wherein said vertically disposed aperture includes a position recessed within said aperture where said fluid is discharged, thereby protecting the location at which such discharge occurs from accidental external contact.

19. A sanitary liquid dispenser according to claim 14 further including adjusting means for adjusting said time interval.

20. A sanitary liquid dispenser according to claim 14 further including reset means responsive to the closing of said valve for preventing said valve from reopening until a predetermined time interval has transpired.

21. A sanitary liquid dispenser according to claim 14 in which said object is a hand.

22. A sanitary liquid dispenser according to claim 14 in which said object is a head.

23. A sanitary liquid dispenser according to claim 14 in which said upper hemisphere is transparent.

24. A sanitary liquid dispenser according to claim 14 in which said disposable deformable bag is oval shaped.

25. A sanitary liquid dispenser according to claim 14 in which said downwardly extending rigid tubular guide means includes only one valve seat and one valve gate therewithin.

26. A container adapted for inclusion within a dispenser, said container comprising a fluid containing bag having upper and lower portions, said bag having a major part thereof of reversibly deformable material adapted to deform inwardly as fluid is drained from said container thereby preventing entry of air thereinto to replace drained fluid, an essentially non-deformable tubular extension integrally joined to said fluid container adapted to conduct fluid outwardly from said container, said tubular extension having mounted therein a magnetically actuable single-seated valve member selectively conditionable between open and closed conditions, thereby to permit or prevent flow of fluid from said container.

27. A container according to claim 26 wherein the upper and lower parts of said fluid containing bag are comprised of different materials.

28. A container according to claim 27 in which the material of the upper portion of said bag is transparent.

29. A container according to claim 26 in which said major part thereof is curved when said container is filled with fluid.

30. A container according to claim 26 in which said fluid containing bag is oval shaped when filled with fluid.

31. A container in accordance with claim 26 in which said major part of said bag comprises the upper part of said bag when said bag is positioned within said dispenser.

* * * * *